(No Model.)

O. SCHRADER.
SAFETY BRIDLE.

No. 322,012.    Patented July 14, 1885.

Witnesses:
Geo. A. Dickson
G. W. Emerson

Inventor:
Otto Schrader
by
E. R. Dobson
Attorney.

UNITED STATES PATENT OFFICE.

OTTO SCHRADER, OF ALAMEDA, CALIFORNIA.

SAFETY-BRIDLE.

SPECIFICATION forming part of Letters Patent No. 322,012, dated July 14, 1885.

Application filed September 21, 1883. (No model.)

*To all whom it may concern:*

Be it known that I, OTTO SCHRADER, a citizen of the United States, residing in Alameda, county of Alameda, State of California, have made and invented certain new and useful Improvements in Safety-Bridles and Curb-Reins for Horses, of which the following is a full, clear, and exact description, the accompanying drawing forming a part of this specification, being referred to by figures and letters.

My invention relates to devices and attachments to that portion of the horse's harness which is included under the term bridle; and the object of my improvements is to give the horseman or driver complete command over his animal with a single rein, and without complicated parts and mechanism.

I proceed to construct, apply, and carry out my said invention in substantially the following manner.

Figure 1:
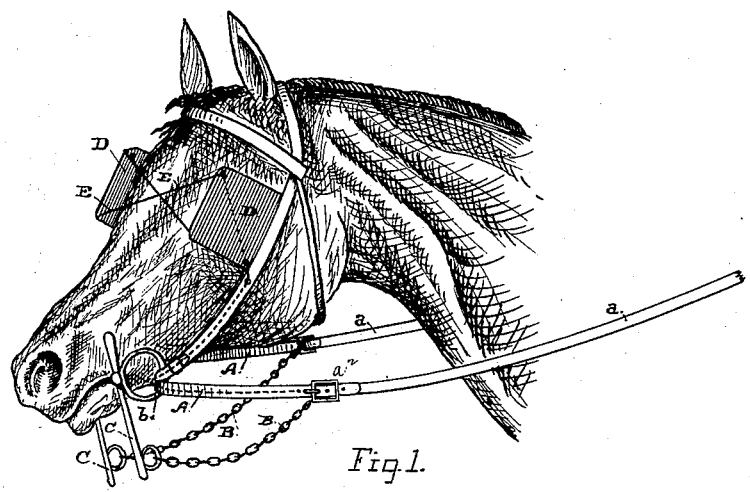
Figure 2:
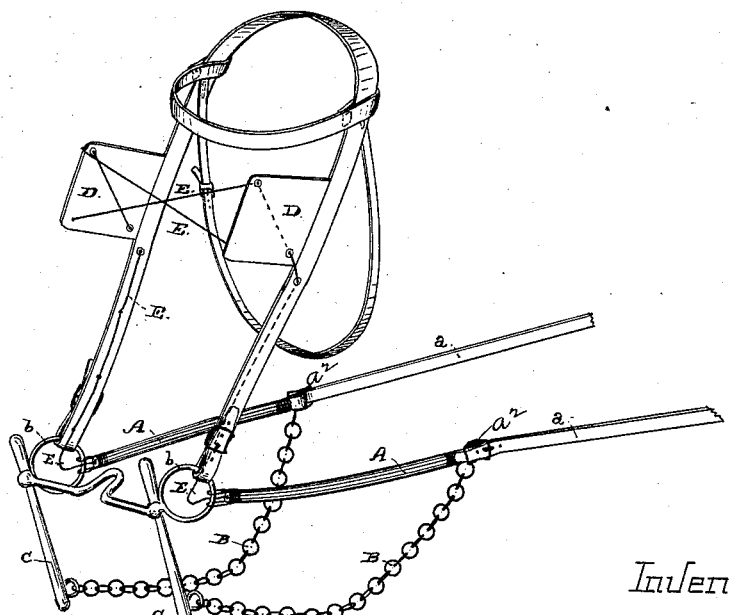

Referring to the said drawings, Figure 1 shows a blind-bridle of the ordinary kind with my improvements applied to it, so that the bit, curb, and blinders are operated by a single rein, and the relative positions of the several parts when fitted on the animal. Fig. 2 shows the bridle removed from the horse.

The driving-reins $a$ $a$ are connected with the rings $b$ of the bridle-bit by means of an elastic strap or band, A, at each side. These elastic parts are either solid straps or bands, as represented in Fig. 1, or they are formed of a rubber tube or a length of round rubber, as seen in Fig. 2. They are provided at one end with buckles, $a^2$, by which the ends of the driving-reins are secured to them, and they are attached by loops, snaps, or any suitable fastenings to the rings of the bit at the other end. From the point of attachment of the drive-reins with these parts A, a chain or strap, B, is carried forward and attached to the lower end of the bar or branch $c$ of the curb-bit at each side. This connection B is long enough to remain slack under ordinary conditions of strain, but when the pull upon the lines becomes sufficient to stretch the elastic connections A this excess in length is taken up, and the chains then draw upon the branches C and bring the curb into action.

The operation of the device is rendered more delicate by increasing the elasticity of the strap A, or by shortening the curb-chain B, or by simply altering either part in the required degree. The more ready mode of adjustment is to alter the length of the curb-chain. In connection with these well-known parts of a bridle I provide an attachment for closing the blinders against the eyes of the animal as a means for more completely controlling a timid or a frightened horse in an emergency.

My invention is applied to bridles when blinders are employed; and it consists simply of an arrangement of cords, E, to connect the front ends of the blinders with the elastic draw-straps A, so that when the pull upon the reins is strong enough to distend the elastic strap and bring the curb into play these cords E will be drawn and caused to press the blinders D against the eyes of the animal. Under ordinary conditions the cords are sufficiently slack to permit the driving-rein to work without moving the blinders. They are attached at one end to the fronts of the blinders, and being crossed over the face of the horse, they are carried down to the bit-rings, and thence back to the point where the drive-rein connects with the elastic strap. At this point the cord is attached to the drive-rein. Where a tubular draw-strap, A, is used the cord E is carried through the center of the tube and thence from the inner or bit end up to the blinders, and the cord of one side crosses over to connect with the opposite blinder of the headstall in such manner that the strain upon the two cords shall draw the blinders over against the face of the horse. These parts or devices combined in such manner are operated by a single rein, and when employed together they give a timid or inexperienced rider complete command over a particularly unruly or high-spirited animal.

Having thus fully described my invention, what I claim and desire to secure by Letters Patent, is—

The combination, with the blinders of a bridle, of the draw-cords and the elastic draw-straps having attachments with the bit and with the drive-rein, substantially as herein described.

OTTO SCHRADER. [L. S.]

Witnesses:
  H. STENDER,
  EDWARD E. OSBORN.